(12) United States Patent
Cuppett et al.

(10) Patent No.: US 7,596,740 B1
(45) Date of Patent: Sep. 29, 2009

(54) APPARATUS FOR PROCESSING FIBRE CHANNEL AND SCSI FRAMES AT WIRE SPEED

(75) Inventors: Jeff Cuppett, Los Altos, CA (US); Reynold Leong, San Jose, CA (US); Rahim Ibrahim, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 1122 days.

(21) Appl. No.: 10/695,141

(22) Filed: Oct. 27, 2003

Related U.S. Application Data (60) Provisional application No. 60/422,109, filed on Oct. 28, 2002.

(51) Int. Cl.
    *H03M 13/00* (2006.01)
(52) U.S. Cl. ..................................... 714/776
(58) Field of Classification Search ............... 714/776
    See application file for complete search history.

(56) References Cited

U.S. PATENT DOCUMENTS

| | | | |
|---|---|---|---|
| 5,682,537 A | 10/1997 | Davies et al. | |
| 5,960,434 A | 9/1999 | Schimmel | |
| 6,084,877 A | 7/2000 | Egbert | |
| 6,233,242 B1 | 5/2001 | Mayer | |
| 6,249,521 B1 | 6/2001 | Kerstein | |
| 6,343,339 B1 | 1/2002 | Daynes | |
| 6,356,944 B1 * | 3/2002 | McCarty | 709/222 |
| 6,721,320 B1 | 4/2004 | Hoglund | |
| 6,728,861 B1 * | 4/2004 | Roach et al. | 711/220 |
| 6,757,769 B1 | 6/2004 | Ofer | |
| 6,915,296 B2 | 7/2005 | Parson | |
| 6,965,893 B1 | 11/2005 | Chan et al. | |
| 7,069,268 B1 | 6/2006 | Burns | |
| 2003/0084268 A1 | 5/2003 | Mashima | |
| 2004/0006572 A1 | 1/2004 | Hoshino et al. | |
| 2004/0068607 A1 | 4/2004 | Narad | |
| 2004/0199734 A1 | 10/2004 | Rajamani et al. | |

* cited by examiner

*Primary Examiner*—Guy J Lamarre
(74) *Attorney, Agent, or Firm*—Wiesner & Associates; Leland Wiesner (57) ABSTRACT

One or more circuits that validate data frames are provided. The validation may validate information for a fiber channel header and information for a small computer system interface (SCSI) header. The validation is performed by one or more circuits at wire speed.

9 Claims, 7 Drawing Sheets

APPARATUS FOR PROCESSING FIBRE CHANNEL AND SCSI FRAMES AT WIRE SPEED

CROSS-REFERENCES TO RELATED APPLICATIONS

This application is a non-provisional application of and claims the benefit of U.S. Provisional Application No. 60/422,109, filed on Oct. 28, 2002, which is incorporated by reference in its entirety for all purposes.

BACKGROUND OF THE INVENTION

The present invention generally relates to data frame processing and more specifically to a circuit configured to process data frames at wire speed.

As frames are transferred through a network, a frame processor validates information in the frame. The format of the information in the frames may be checked for errors. The validation ensures that valid frames are transferred through the network and that a system does not process frames that may cause an error.

In validating data frames, information in the frames is compared to values that should be found in the information. Typically, software code that checks the values of the information using variables in the code. The use of software code to perform the validation of data frames includes many disadvantages. For example, the use of software code may be very time consuming in determining if a data frame is valid. Also, the code is not scalable in that if the speed of data frames being transferred increases, the code cannot be scaled to check the increased data flow. Rather, the amount of data that can be validated remains the same even though more data is being transferred. Thus, bottlenecks may occur when the data flow increases.

The software code may include many conditional branches to perform the validation check. The processing of the conditional branches to validate a data frame may take a large amount of time. Thus, the validation may cause delays in transferring the data frame. Accordingly, software code may not be able to validate data frames in a sufficient amount of time so that data frames can be transferred at wire speed.

BRIEF SUMMARY OF THE INVENTION

Embodiments of the present invention provide one or more circuits that validate data frames. The validation may validate information for a fiber channel header and information for a small computer system interface (SCSI) header. The validation is performed by one or more circuits at wire speed.

In one embodiment, a circuit configured to process one or more fibre channel and SCSI frames of data is provided. The circuit comprises: one or more gates configured to validate format information included in a frame of data, wherein error information is written in the frame of data if an error is found in the format information; and one or more gates configured to validate command information included in the frame of data, wherein error information is written in the frame of data if an error is found in the command information, wherein the error information for the format information or command information is used in processing a storage operation for the frame of data, wherein the validation of the format information and command information is performed at wirespeed.

In another embodiment, a circuit configured to process one or more frames of data is provided. The circuit comprises: a fibre channel circuit configured to validate a fibre channel header included in a frame of data, wherein error information is written in the frame of data if an error is found in the fibre channel header; and a SCSI circuit configured to validate a SCSI header included in the frame of data, wherein error information is written in the frame of data if an error is found in the SCSI header, wherein the error information for the format information or command information is used in processing a storage operation for the frame of data, wherein the validation of the fibre channel information and SCSI information is performed at wirespeed.

In yet another embodiment, a method for processing fibre channel and SCSI frames of data using an integrated circuit is provided. The method comprises: receiving a frame of data, the frame of data comprising format information and command information; determining if the format information is valid; if the format information is not valid, writing error information indicating an error in the format information in the frame of data; determining if the command information is valid; and if the command information is not valid, writing error information indicating an error in the command information in the frame of data, wherein the error information for the format information or command information is used in processing a storage operation for the frame of data, wherein determining if the format information valid and determining if the command information is valid is performed at wire speed.

A further understanding of the nature and the advantages of the inventions disclosed herein may be realized by reference of the remaining portions of the specification and the attached drawings.

DETAILED DESCRIPTION OF THE INVENTION

Figure 1:
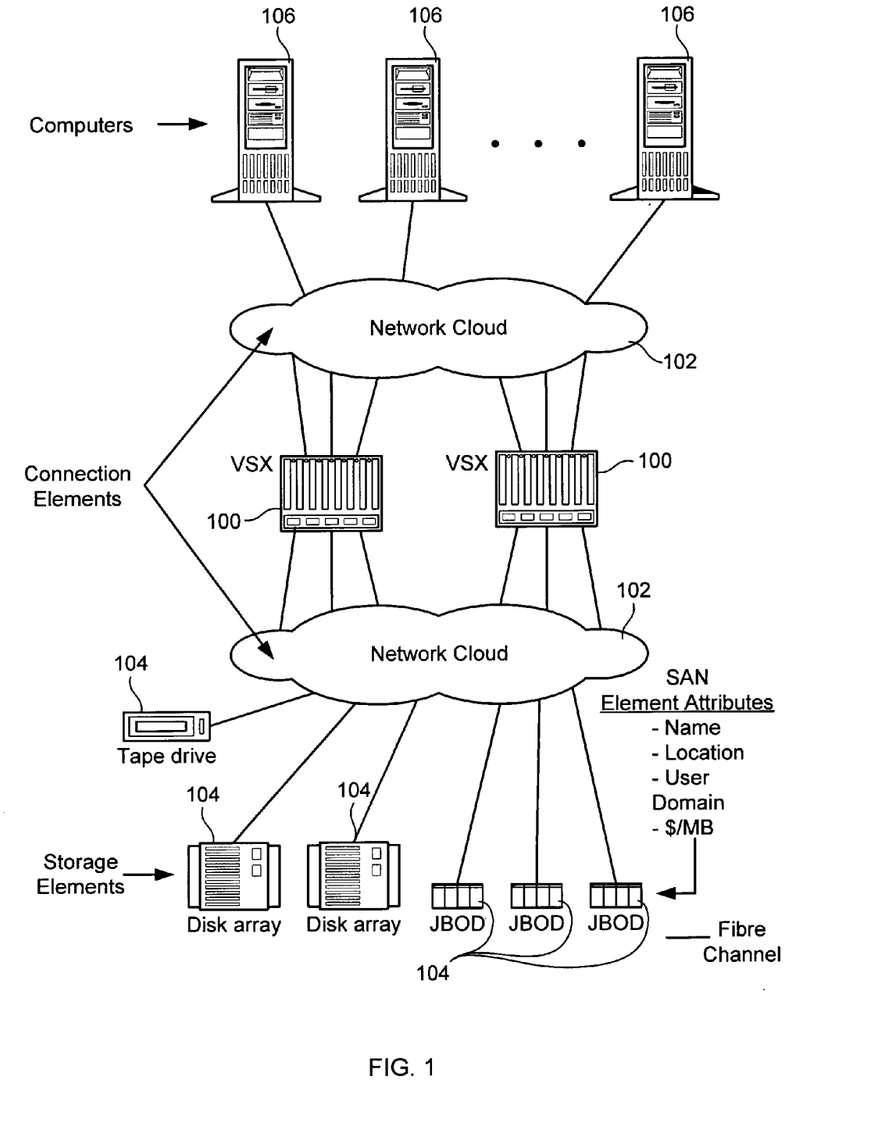
FIG. 1 shows a storage server (VSX) according to an embodiment of the present invention.

FIG. 1 shows a storage server (VSX) 100 according to an embodiment of the present invention. The figure also shows a storage area network (SAN) 102, a number of physical storage devices 104, and a number of host computers 106. The storage server 100 is also referred to as a Virtual Storage Exchange (VSX) and is further detailed in FIG. 2.

The SAN 102 can be any type of computer network. It is referred to as a storage area network in the present application because that is its relevant function with respect to the embodiments of the present invention. In an embodiment of the present invention, the SAN 102 is a Fibre Channel network, the host computers 106 and the storage devices 102 are configured to communicate with a Fibre Channel network, and VSX 100 is also configured to communicate with a Fibre Channel network. Thus, VSX 100 can be easily added to an existing SAN.

The physical storage devices 104 include tape drives, disk arrays, JBODs ("just a bunch of disks"), or other types of data storage devices. The physical storage devices 104 can be connected directly to the host computers 106, can be connected directly to the host computers 106 via the SAN 102 or can be indirectly connected to the host computers 106 via the SAN 102 and VSX 100. In any case, SAN 102 is optional. In one embodiment of the present invention, management of storage virtualization is implemented by using VSX 100 to indirectly connect the storage devices 104 to the host computers 106.

The host computers 106 can be servers or stand-alone computers. The host computers 106 can be directly connected to the SAN 102 or indirectly connected via a switch, router, or other communication link.

Figure 2:
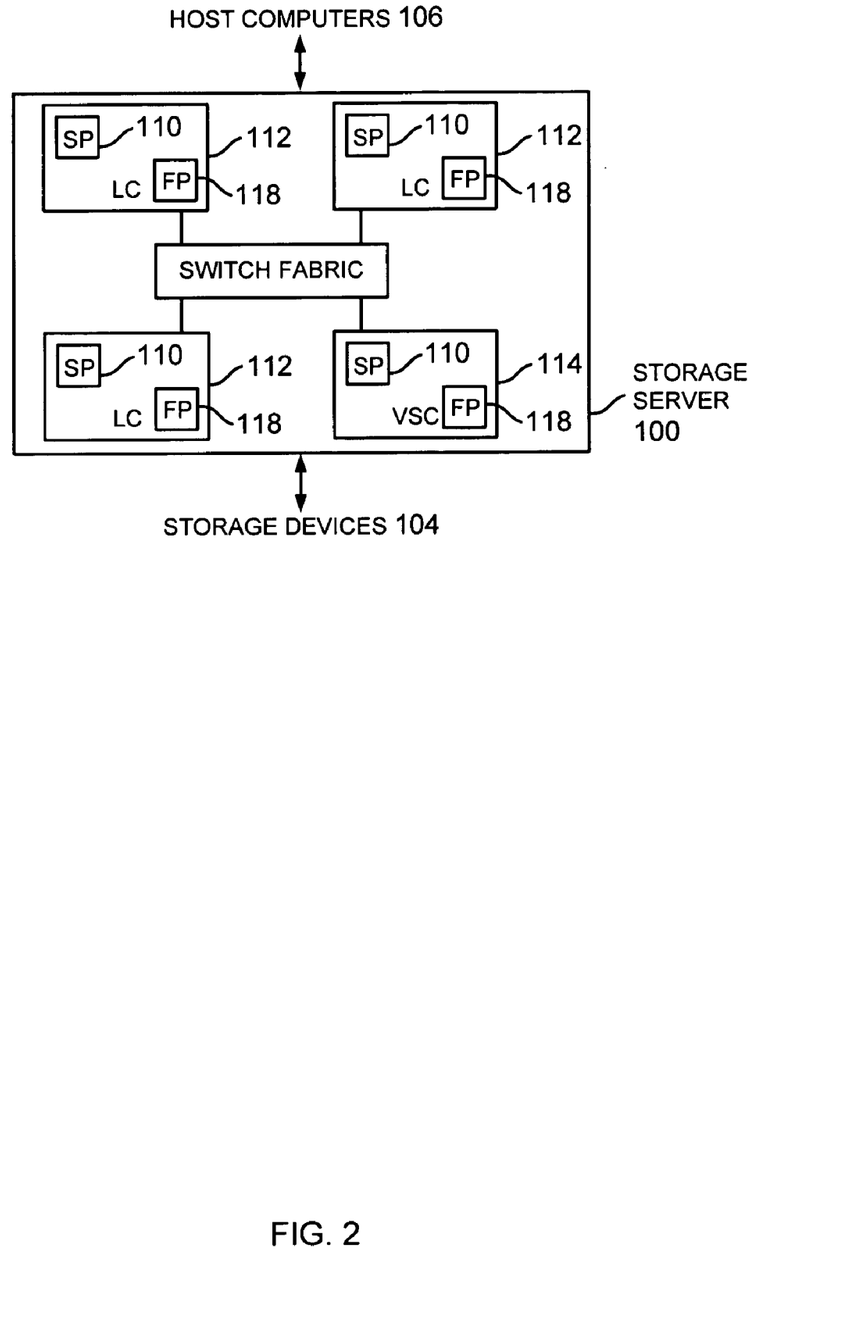
FIG. 2 is a Block diagram of VSX showing the hardware components related to embodiments of the present invention.

FIG. 2 is a Block diagram of VSX 100 showing the hardware components related to embodiments of the present invention, including a storage processor 110, a line card 112, a Virtual Storage Control card 114, and an internal switch fabric 116.

VSX 100 may include one or more storage processors 110. The storage processors 110 process the storage commands and data to be stored or retrieved as information flows between the host computers 106 and the storage devices 104. One or more of the storage processors 110 may be included on each line card 112. VSX 100 includes space for numerous line cards 112, so the capabilities of VSX 100 can be modularly increased by adding more line cards 112 or more storage processors 110. Each storage processor 110 is associated with one or more ports of VSX 100.

VSX 100 may also include one or more frame processors 118. Frame processors 118 are configured to process frames of data as information flows between host computers 106 and storage devices 104. One or more frame processors 118 may be included on each line card 112. Frame processor 118 process frames of data to determine if any errors exist in the data frames. In one embodiment, the processing is done in hardware. If any errors are found, information is written into the data frame indicating that an error was found. Storage processor 110 then processes the data frame using the error information.

VSX 100 may include one or more Virtual Storage Control cards 114. The Virtual Storage Control cards control the operation of VSX 100 and control the line cards 112, which perform the actual work of transferring commands and data.

The switch fabric 116 connects the storage processors 110. The switch fabric switches information received at one internal port to another internal port of VSX 100. For example, when a host computer 106 wants to read data stored on the storage area network 102, its request is processed by the storage processor 110 associated with the port associated with that host computer 106. That storage processor 110 is referred to as the upstream storage processor 110. The upstream storage processor 110 communicates with a downstream storage processor 110 associated with the port associated with the storage device 104 storing the data to be read, via the switch fabric 116. Then the switch fabric 116 transfers the data read from the storage device to the host computer 106, via the downstream and upstream storage processors 110.

Figure 3:
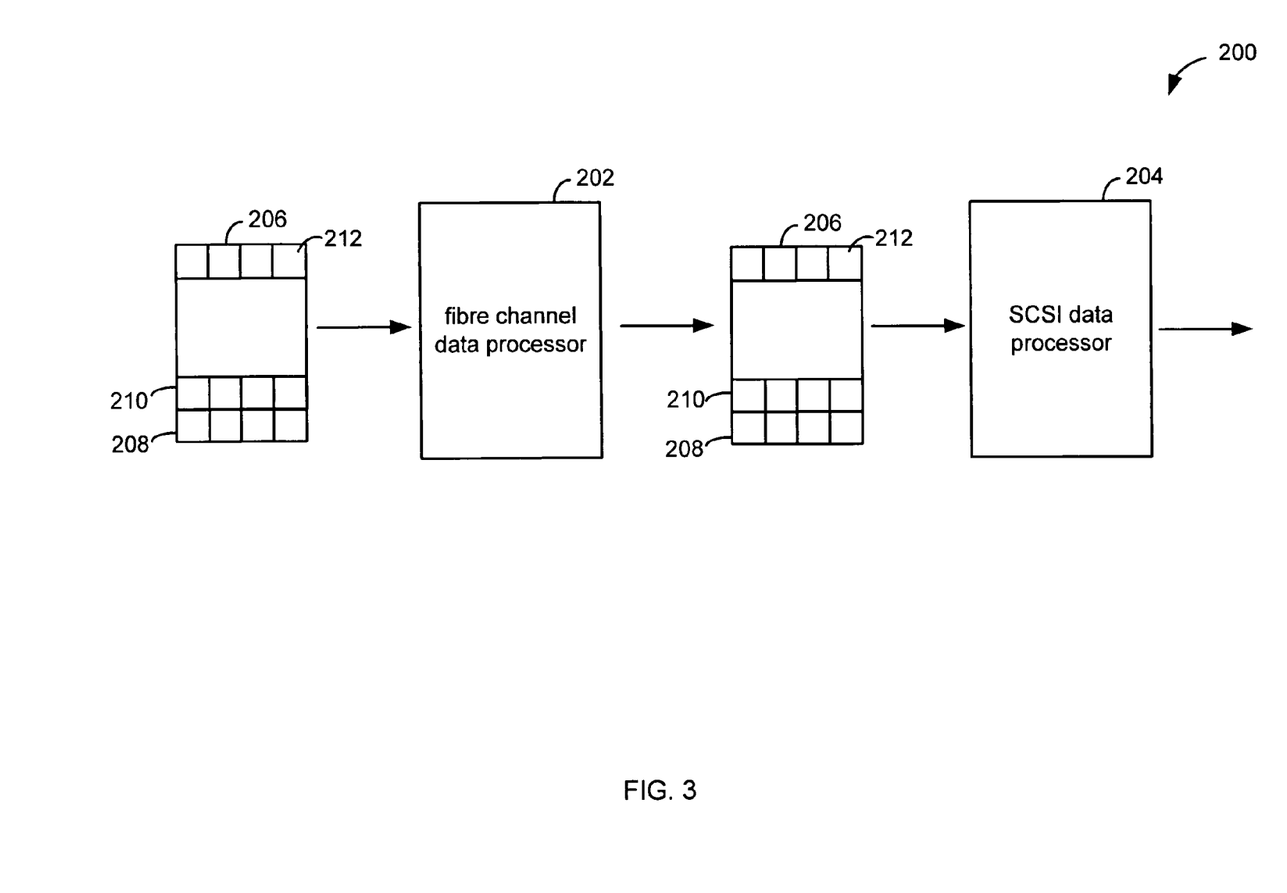
FIG. 3 illustrates a simplified block diagram of a system for processing data frames according to one embodiment of the present invention.

FIG. 3 illustrates a simplified block diagram of a system 200 for processing data frames according to one embodiment of the present invention. System 200 includes an embodiment of frame processor 118, which includes fiber channel data processor 202 and a SCSI data processor 204. Fiber channel data processor 202 and SCSI data processor 204 process a data frame 206. Although the processing is described using a single data frame 206, it will be understood that many data frames may be processed. It will be further understood that while the frame processing described is performed serially, the processing could be performed in parallel as well.

In one embodiment, fiber channel data processor 202 and SCSI data processor 204 process data frame 206 at wire speed. In one embodiment, wire speed refers to the ability to process and transfer data frames through a network as the data frames are received. For example, if data frames are transferred at a certain speed, fiber channel data processor 202 and SCSI data processor 204 are configured to process the data frames as they are received. Also, if the speed of the data frames that are received increases, fiber channel data processor 202 and SCSI data processor 204 can still process data frames as they are received. For example, fibre channel data processor 202 and SCSI data processor 204 may be scaled to process any number of data frames.

Data frame 206 includes information that may be validated by fiber channel data processor 202 and SCSI data processor 204. For example, data frame 206 includes a first and second header referred to as a SCSI header 208 and a fibre channel header 210. Data frame 206 is only shown with header information, however, it will be understood that data frame 206 may also include other information, such as payload information, other header information, etc.

SCSI header 208 includes information that is processed by SCSI data processor 204. The SCSI information is used by a SCSI manager to perform SCSI tasks. For example, commands for one or more storage processors 110 are included in the SCSI information. The commands may include commands for accessing storage devices 104.

Fiber channel header 210 includes information corresponding to the transfer of data frame 206 through SAN 102. In one embodiment, the information includes information related to the transfer of data frames 206 through a fiber channel. This information includes, but is not limited to information for the fibre channel storage device 104 being accessed, the transfer attributes, and/or the task management attributes.

Fiber channel data processor 202 comprises a circuit that is configured to validate bits of information found in data frame 206. Specifically, the circuit validates bits found in fiber channel header 210. In one embodiment, if any errors are found in header 210, fiber channel data processor 202 writes information in data frame 206 about the error found. For example, fiber channel data processor 202 may write information in an error field 212 depending on the result of the validation of fiber channel header 210. The written information may then be used by storage processor 110 when it processes a command for data frame 206.

When data frame 206 has been processed by fiber channel data processor 202, SCSI data processor 204 is configured to validate information in SCSI header 208. In one embodiment, SCSI data processor 204 comprises a circuit that validates bits of information in SCSI header 208. In one embodiment, SCSI data processor 204 considers error field 212 in validating SCSI header 208. For example, SCSI data processor 204 may or may not validate SCSI header 208 depending on information in error field 212.

In one embodiment, SCSI data processor 204 validates a command that is included in data frame 206. For example, a command may be an opcode that designates an action, such as a storage operation, to be performed by VSX 100. In one embodiment, SCSI data processor 204 validates the command using one or more circuits. If the command is supported, the data frame 206 is validated. If an error is found in SCSI header 208, SCSI data processor 204 may write information in data frame 206 that indicates an error has been found. For example, the information may indicate that the command is not supported.

Fiber channel data processor 202 and SCSI data processor 204 validate data frame 206 at wire speed using one or more circuits that validate bits of data in data frame 206. The one or more circuits can be scaled such that any number of data frames can be processed as they are received. In one embodiment, masks are used to validate information in data frame 206, the masks compare the information bit by bit using any combination of gates. Because gates are used, any number of bits may be validated so that a data frame 206 is validated at wire speed. Additionally, if desired, multiple data frames may be processed simultaneously by implementing multiple instances of the gates. Thus, VSX 100 can validate and process data frame 206 at wire speed without the delays of a validation that is done using software.

If information in data frame 206 indicates that an error has been found fiber channel header 210 or SCSI header 208, storage processor 110 may perform an error recovery task. An error recovery table may include not validating SCSI header 208, performing the validation differently than if there were no errors, attempting to correct the error, etc. Examples of error recovery methods are disclosed in application Ser. No. 10/076,906, filed Feb. 13, 2002 and entitled "Failover Processing in a Storage System", which is incorporated by reference for all purposes. Additionally, storage processor 110 may perform other actions depending on the information written to data frame 206. For example, storage processor 110 may not process data frame 206.

Figure 4:
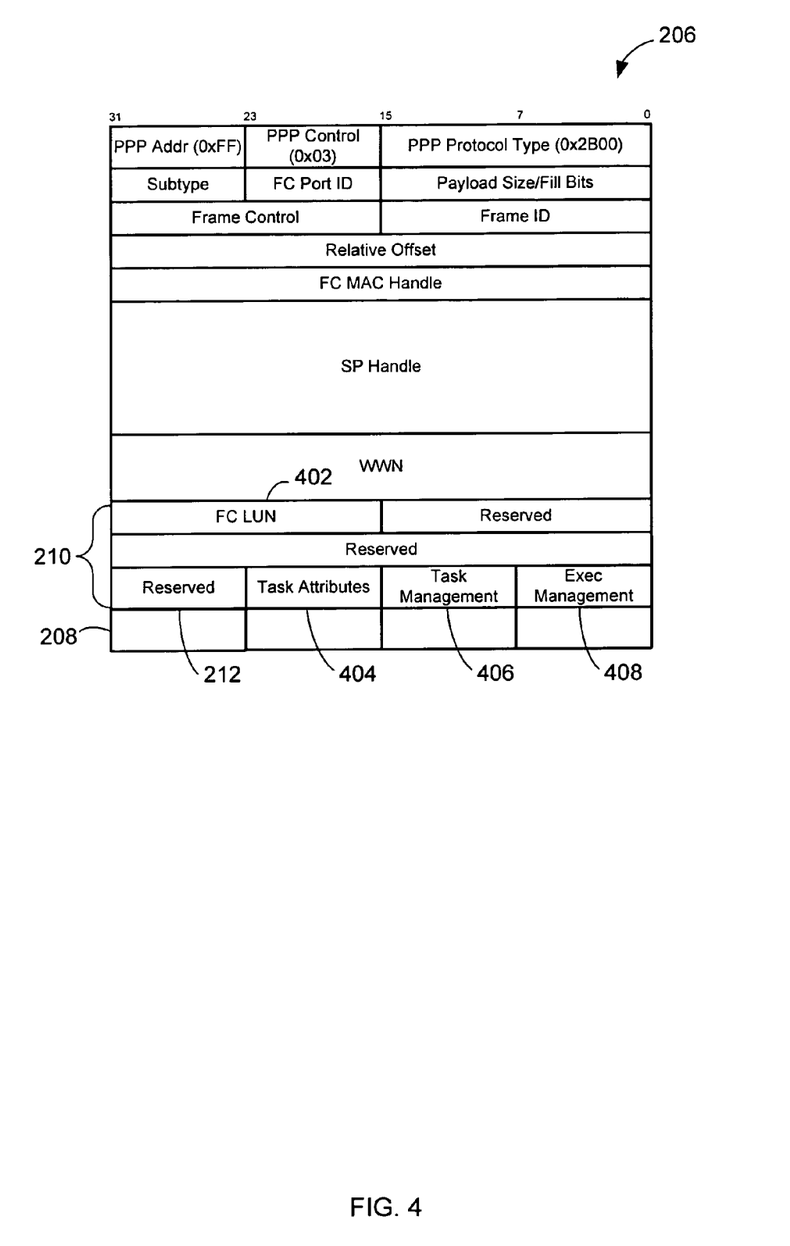
FIG. 4 depicts an embodiment of a data frame according to embodiments of the present invention.

FIG. 4 depicts an embodiment of data frame 206 according to embodiments of the present invention. As shown, data frame 206 includes SCSI header 208 and fiber channel header 210.

Fiber channel data processor 202 checks the value in an FC LUN field 402. In one embodiment, the value in FC LUN field 402 may be checked to determine if it is not greater than a determined value.

Task attributes 404, task management values 406, and exec management values 408 are also checked. Tables 1-3 illustrate values that may be used to check the values of task attributes 404, task management values 406, and exec manager values 408. In one embodiment, one or more gates are used to verify that bits of information in values 404, 406, and 408 are equal to one of the values found in tables 1-3. Although tables 1-3 are described, it will be understood that other values may be used to validate information.

TABLE 1

Task Attributes

| Value | Description |
|---|---|
| 0000_0000 | Simple Q |
| 0000_0001 | Head of Q |
| 0000_0010 | Ordered Q |
| 0000_0100 | ACA Q |
| 0000_0101 | Untagged Q |

TABLE 2

Task Management Flags

| Value | Description |
|---|---|
| 0x80 | Terminate Task |
| 0x40 | Clear ACA |
| 0x20 | Target Reset |
| 0x10 | LUN Reset |
| 0x08 | Reserved |
| 0x04 | Clear Task Set |
| 0x02 | Abort Task Set |
| 0x01 | Reserved |

TABLE 3

Execution Codes

| Value | Description |
|---|---|
| Others | Reserved |
| 0x02 | Read Data |
| 0x01 | Write Data |
| 0x00 | None |

In one embodiment, fiber channel data processor 202 verifies that only one task manager flag is set. In one embodiment, if any of the task manager flags are set, fiber channel data processor 202 does not verify the task attributes or execution management codes.

Additionally, fiber channel data processor 202 checks to see that all reserved fields are zero. It will be understood that fiber channel data processor 202 may also check to see if the reserved fields are other values, such as all ones or any combination of values.

Accordingly, fiber channel data processor 202 checks the format of fiber channel header 210. If the any of the checks fail, fiber channel data processor 202 modifies information in data frame 206. For example, an error field 212 may be modified to indicate that an error has been detected. The information is then used by SCSI data processor 204 in processing data frame 206.

Figure 5:
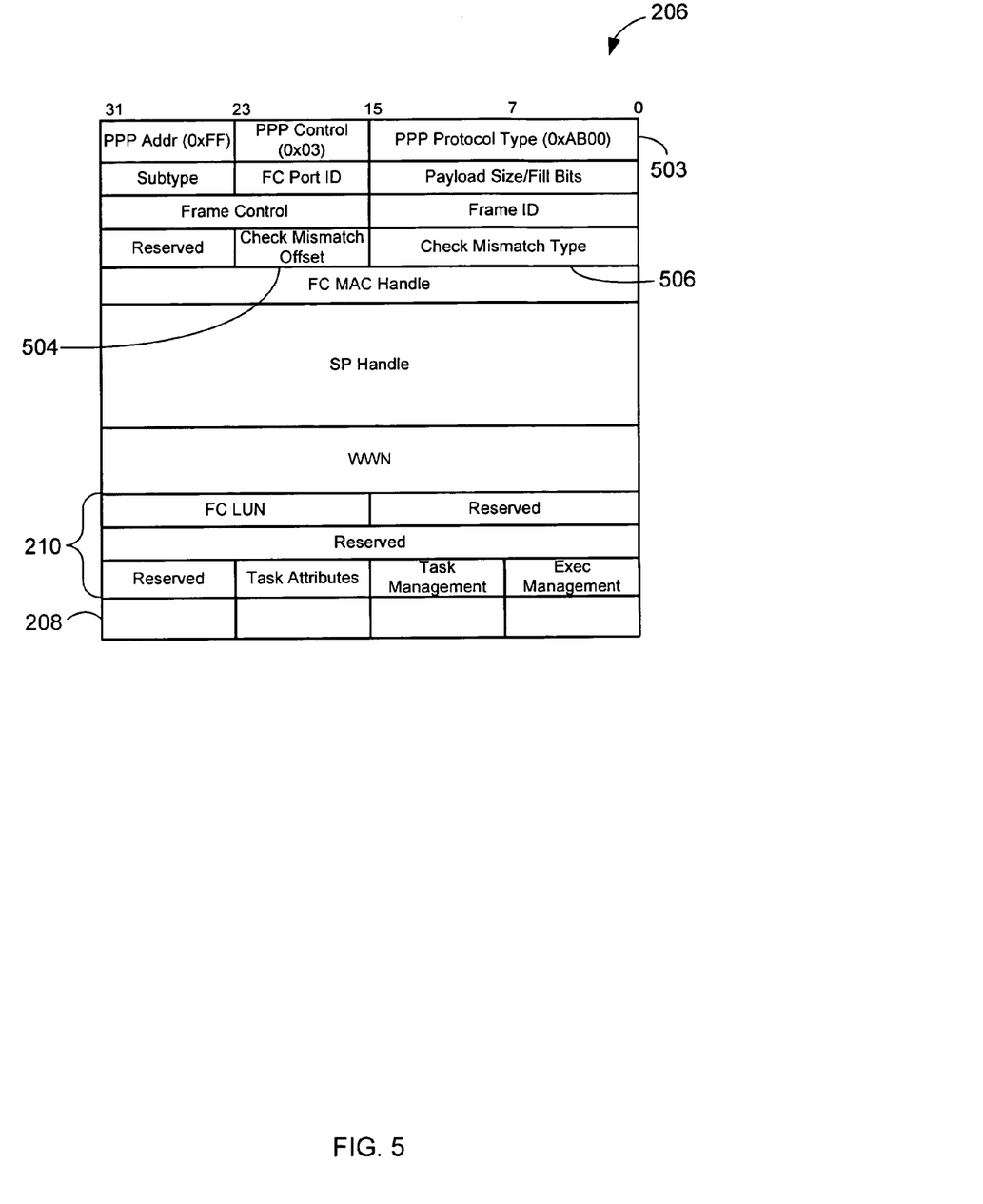
FIG. 5 depicts a data frame that has been processed by a fiber channel data processor and a SCSI data processor according to one embodiment of the present invention.

FIG. 5 depicts a data frame 206 that has been processed by fiber channel data processor 202 and SCSI data processor 204 according to one embodiment of the present invention. Data frame 206 includes information that may indicate that an error has occurred. In one embodiment, error field 212 includes a protocol type field 503, a check mismatch offset field 504, and a check mismatch type field 506 that may be altered to indicate an error occurred during processing of FC header 210. Information that may be input for these fields is described below.

In one embodiment, SCSI data processor 204 determines if an error was found by fiber channel data processor 202 by checking error field 212 in data frame 206. If field 212 indicates an error was found, SCSI data processor 204 may not check SCSI header 208.

Because VSX 100 may not support all possible opcodes for data frame 206, SCSI data processor 204 verifies that opcode 502 is supported by VSX 100. If an error is found, information may be written to data frame 206. For example, information in protocol type field 503, check mismatch offset field 504, and check mismatch type field 506 may be altered.

In one embodiment, check mismatch type field 506 indicates what type of error has been found. Table 4 shows an example of different error codes for corresponding errors that may be used.

TABLE 4

Check Mismatch Error Types

| Error Code | Check Mismatch Type | Mismatch Description |
| --- | --- | --- |
| 0x0000 | Unused | — |
| 0x0001 | FC LUN Check Failed. | FC LUN Value greater than that programmed into the FCLUNValue register. |
| 0x0002 | FC Header Check Failed | Reserved fields in FC Header Contain non-zero data. |
| 0x0004 | Task Attributes Check Failed | Task Attributes field contains an unsupported value. |
| 0x0008 | Task Management Check Failed | Task Management field contains an unsupported value. |
| 0x0010 | Execution Code Check Failed | Execution Code field contains an unsupported value. |
| 0x0020 | SP Check Required | Opcode verification table indicates the SP is to verify this CDB or the task management field is non-zero. |
| 0x0040 | Unsupported Opcode | Opcode verification table indicates the VSX does not support this opcode. |
| 0x0080 | CDB Verification Failed | Opcode verification indicates this frame contains invalid non-zero date bits. |
| 0x0100 | CDB Length Check Failed | CDB Length is less than 20 bytes and there are no task management bits set. |
| 0x0200 | Search Engine No Match | Search Engine does not contain an entry for this WWN, Nile Port ID, FC LUN triplet. |

In one embodiment, check mismatch offset field 504 indicates where the error was found in data frame 206. For example, the field and/or bits that caused the error are identified.

Figure 6:
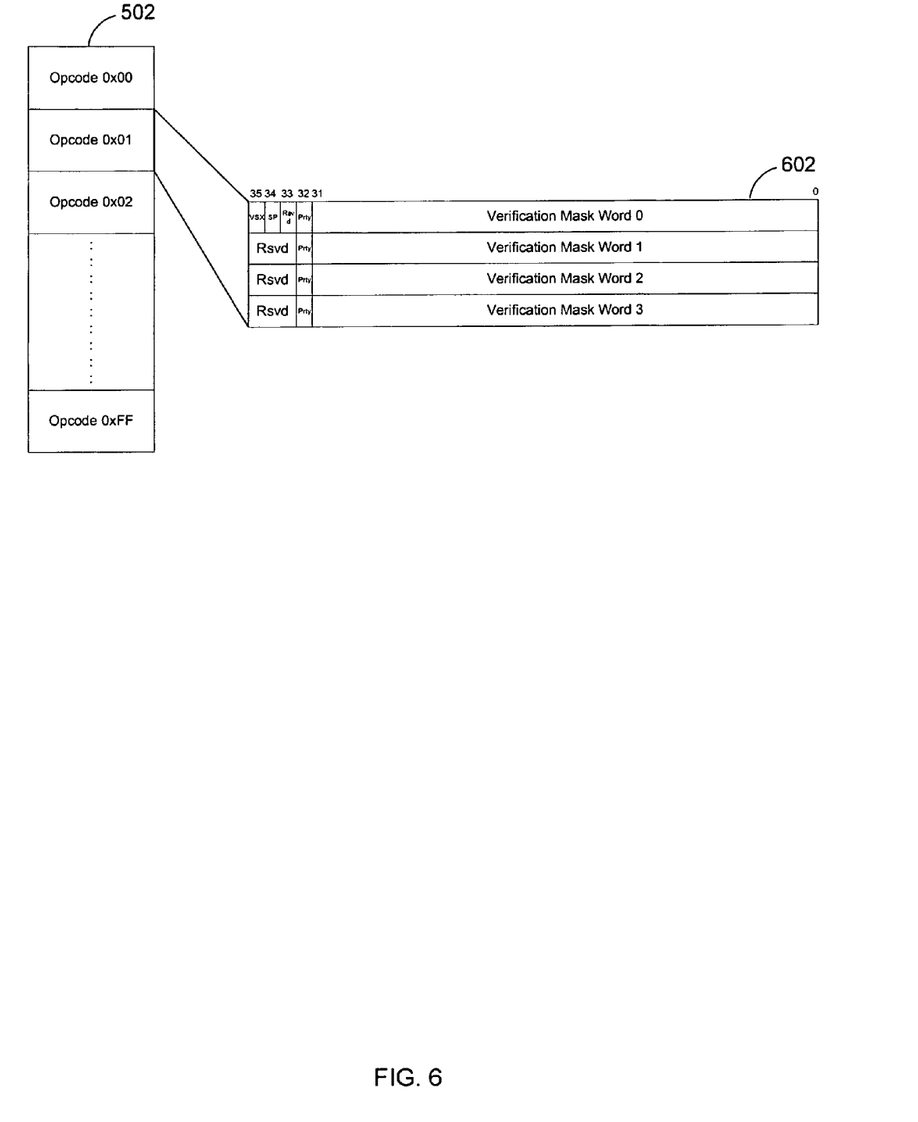
FIG. 6 illustrates an opcode verification code table format according to one embodiment of the present invention.

In one embodiment, a verification mask is determined that may be used to validate opcode 502. FIG. 6 illustrates an opcode verification code table format according to one embodiment of the present invention. A verification mask 602 is used to mask off bits or fields of an incoming opcode SCSI header.

Figure 7:
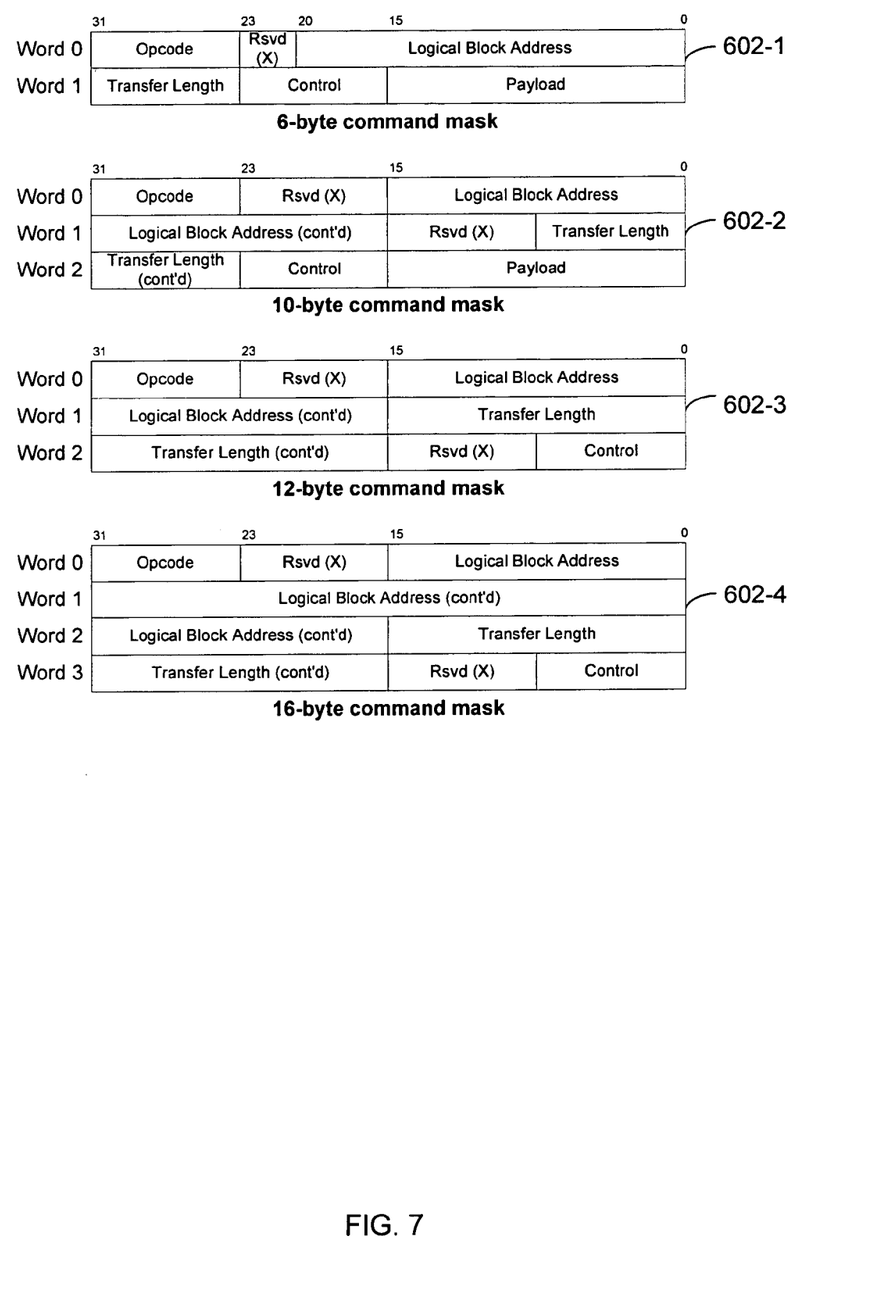
FIG. 7 illustrates the SCSI CDB format for an opcode header of a 6 byte, 10 byte, 12 byte, and 16 byte command according to one embodiment of the present invention.

In one embodiment, verification mask 602 is chosen using opcode 502 and is applied word by word to the beginning SCSI header starting with opcode 502. Mask 602 can verify any bit or field in any command by simply setting the appropriate bits in the appropriate mask. FIG. 7 illustrates various 6 byte, 10 byte, 12 byte, and 16 byte SCSI headers 602-1, 602-2, 602-3, and 602-4 for an opcode that can be checked using a single verification mask according to one embodiment of the present invention.

In one embodiment, SCSI data processor 204 checks opcode 502 to determine if any errors are found. The mask is configured to be applied to bits in SCSI header 208 so that a result of applying the mask should yield a desired value (e.g., zero). In one embodiment, the bits of SCSI header 208 are passed through one or more gates that represent the mask. If any bits are set after the mask is applied, an error has been detected. Information in data frame 206 is the set to indicate that an error has been found. For example, PPP protocol type field 503 may be changed to a value 0xAB00 and a value for check mismatch type 506 is inserted to give an indication that the opcode verification check failed.

Accordingly, a circuit verifies information in data frames at wire speed. Information in a fiber channel header and a SCSI header are verified using one or more gates. A fibre channel header is first validated and if an error is found, information about the error is written to the data frame. The results of the validation of the fiber channel header may then be used by a SCSI data processor in processing the SCSI header.

Embodiments of the present invention include many advantages. For example, because a circuit is used for the validation, data frames may be validated at wire speed. Also, the circuit may be scalable in that any number of data frames may be processed at wire speed. Thus, the circuit may be scaled to validate data frames at wire speed even when the speed of data transferred increases.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope of equivalents.

What is claimed is:

1. A circuit configured to process one or more fibre channel and SCSI frames of data, the circuit comprising:
   one or more gates corresponding to a number of bits to be validated that validate format information included in a frame of data with simultaneous bit by bit comparisons, wherein error information is written in the frame of data if an error is found in the format information; and
   one or more gates corresponding to a number of bits to be validated that validate command information included in the frame of data with simultaneous bit by bit comparisons, wherein error information is written in the frame of data if an error is found in the command information,
   wherein the error information for the format information or command information is used in processing a storage operation for the frame of data,
   wherein the validation of the format information and command information is performed at wirespeed.

2. The circuit of claim 1, wherein the format information comprises fibre channel format information.

3. The circuit of claim 1, wherein the command information comprises SCSI command information.

4. The circuit of claim 1, wherein the format information comprises at least one of task attributes, task management, and executive management information.

5. The circuit of claim 1, wherein the command information comprises opcode information for the storage operation.

6. The circuit of claim 1, wherein the one or more gates comprise one or more masks that validate the command information.

7. A method for processing fibre channel and SCSI frames of data using an integrated circuit, the method comprising:
   receiving a frame of data, the frame of data comprising format information and command information;
   determining if the format information is valid performing a simultaneous bit by bit comparison of the format information using one or more gates if the format information is not valid, writing error information indicating an error in the format information in the frame of data;
   determining if the command information is valid performing a simultaneous bit by bit comparison of the format information using one or more gates and if the command information is not valid, writing error information indicating an error in the command information in the frame of data, wherein the error information for the format information or command information is used in processing a storage operation for the frame of data, wherein determining if the format information valid and determining if the command information is valid is performed at wire speed.

8. The method of claim 7, wherein determining if the format information is valid comprises checking information in the format information using a circuit that performs the determination at wire speed.

9. The method of claim 7, wherein determining if the command information is valid comprises checking information in the command information using a circuit that performs the determination at wire speed.

* * * * *